United States Patent
Tavlarides et al.

(10) Patent No.: US 8,197,558 B2
(45) Date of Patent: *Jun. 12, 2012

(54) SUPERCRITICAL DIESEL FUEL COMPOSITION, COMBUSTION PROCESS AND FUEL SYSTEM

(75) Inventors: Lawrence L. Tavlarides, Fayetteville, NY (US); Gheorghe Anitescu, Syracuse, NY (US)

(73) Assignee: Syracuse University, Syracuse, NY (US)

( * ) Notice: Subject to any disclaimer, the term of this patent is extended or adjusted under 35 U.S.C. 154(b) by 652 days.

This patent is subject to a terminal disclaimer.

(21) Appl. No.: 12/368,062

(22) Filed: Feb. 9, 2009

(65) Prior Publication Data

US 2009/0183423 A1    Jul. 23, 2009

Related U.S. Application Data

(63) Continuation of application No. 10/997,272, filed on Nov. 24, 2004, now Pat. No. 7,488,357.

(51) Int. Cl.
*C10L 1/10* (2006.01)

(52) U.S. Cl. .................. 44/300; 44/457; 585/14

(58) Field of Classification Search .......... 44/457; 585/14

See application file for complete search history.

(56) References Cited

U.S. PATENT DOCUMENTS 7,488,357 B2 * 2/2009 Tavlarides et al. .............. 44/457

FOREIGN PATENT DOCUMENTS

JP 2008115723 * 5/2008

* cited by examiner

*Primary Examiner* — Cephia D Toomer
(74) *Attorney, Agent, or Firm* — David L. Nocilly; Frederick J. M. Price; Bond Schoeneck & King

(57) ABSTRACT

An embodiment of the invention is a composition of diesel, biodiesel or blended fuel (DF) with exhaust gas (EG) mixtures or with liquid $CO_2$. The composition is in a liquid state near the supercritical region or a supercritical fluid mixture such that it quasi-instantaneously diffuses into the compressed and hot air as a single and homogeneous supercritical phase upon injection in a combustion chamber. Suitable temperatures and pressures are greater than about 300° C. and 100 bar, and the mole fraction of EG or $CO_2$ ($X_{EG}$ or $X_{CO2}$) in DF is in the range of 0.0-0.9. In a combustion process embodiment, composition embodiments are injected into a combustion chamber under supercritical conditions.

9 Claims, 5 Drawing Sheets

SUPERCRITICAL DIESEL FUEL COMPOSITION, COMBUSTION PROCESS AND FUEL SYSTEM

CROSS REFERENCE TO RELATED APPLICATION

The present application claim priority as a continuing application to application Ser. No. 10/997,272, filed on Nov. 24, 2004, now issued as U.S. Pat. No. 7,488,357.

BACKGROUND OF THE INVENTION

1. Field of the Invention

Embodiments of the invention generally relate to diesel fuel combustion systems, processes and compositions and, more particularly, to a near-supercritical liquid or supercritical diesel fuel composition, combustion process for the composition and fuel system for the combustion process.

2. Description of Related Art

Recently enacted clean air legislation has targeted fossil fuel emissions. In particular, diesel engine manufacturers and fuel providers are under pressure to develop new solutions for cleaner and more efficient combustion in diesel engines. Engine designers are having to rethink the entire combustion process from beginning to end.

Although fuel combustion is among the oldest known processes to transform chemical energy into useful heat/work power, two major problems are still associated with combustion technology: relatively low energy efficiency and pollution. Successive incremental improvements to classical diesel fuel combustion processes have reached a plateau. Making further improvements in both efficiency and emissions performance has become increasingly limited. Consequently, greater attention needs to be given to fuel formulations and improved combustion processes.

Diesel fuels are complex mixtures of alkanes, alkenes, and aromatic hydrocarbons (>100 components). Biodiesel is a diesel fuel substitute/additive composed of methyl/ethyl esters that are produced from vegetable oils (e.g. soybean, rapeseed) or animal fats. Both of these, as well as other blended diesel fuel mixtures are referred to herein as diesel fuel. Many diesel fuel compounds generate harmful combustion products (e.g., $NO_x$, $SO_x$) due to high combustion temperatures, while other fuel components are incompletely oxidized primarily to CO, aldehydes, and polyaromatic hydrocarbons (PAHs). The generation of these components and other particulate matter pose both health and environmental concerns. The products of the incomplete oxidation process are ultimately due to diesel fuel injection as liquid droplets in the combustion chamber of the engine. Despite the use of preheating, additives, and higher injection pressures to generate micro droplets (around 10 µm diameter range), these problems persist. Even these small droplets fail to completely evaporate and combust. Preheating the fuel provides better fuel-air mixing, however this process is limited to temperatures in the range of about 150-200° C. due to coke, gum and tar formation at higher temperatures. Moreover, a decrease in particulate matter emissions produce an increase in $NO_x$ and $SO_x$ content, and vice versa, challenging the success of meeting ever tighter emission requirements.

Various fuel injection and combustion systems, and fuel compositions are described in the art. By way of example, U.S. Pat. No. 6,010,544 describes a supercritical (SC) composition of matter being a mixture of 5-50% water and a hydrocarbon. The patent discloses experiments performed with this SC composition demonstrating that a cleaner combustion can occur compared to that of subcritical phase diesel fuels. The advantages of this cleaner combustion, however, are offset by the necessary inconvenience of a water tank in addition to the fuel tank and the fact that water requires high energy to be brought to SC conditions. Further, the water is corrosive and its immiscibility with diesel fuel renders its use as a diluent unattractive for diesel engines. US 2002/0088168 discusses the use of gaseous carbon dioxide to form a mixture with low vapor pressure fuels at normal pressures and temperatures. The limited presence of $CO_2$ in diesel fuel is helpful in facilitating the production of micro droplets that enhance combustion in diesel engines resulting in a reduction of particulate matter. However, the amounts of $CO_2$ in the liquid and vapor phases of the proposed composition are affected by mechanical vibrations and variations in pressure and temperature of the fuel stream. More significantly, fuel injection in the form of droplets and the associated problems with droplet combustion persist. WO02/095210 proposes a method for fuel injection in a 4-stroke diesel engine wherein a first portion of the injected fuel is combined with hot exhaust gas to vaporize some of the diesel fuel prior to injection in a homogeneous charge compression ignition (HCCI) process. Control of the ignition timing is a problem associated with a HCCI process because the fuel is injected before the piston is at top dead center position to allow more time for fuel droplets to vaporize. Thus the process proposed under the limited HCCI conditions may not result in complete fuel vaporization. The foregoing references are hereby incorporated by reference in their entirety to the fullest allowable extent.

In light of the foregoing, the inventors have recognized a need for diesel fuel compositions, fuel oxidation processes and fuel combustion systems that overcome the cited disadvantages and others known in the art. In addition, improvements in performance, efficiency, engine life and operating cost reductions are exemplary benefits of the invention embodiments described in detail below.

SUMMARY OF THE INVENTION

Embodiments of the invention are directed to diesel fuel compositions in a liquid near supercritical state, or in a supercritical fluid state, combustion processes for the diesel fuel compositions and fuel systems that utilize the diesel fuel compositions according to embodiments of the invention. As used herein, the term "diesel fuel" refers to marine, automotive, power generation and other standard application diesel fuel, a biodiesel fuel or a blended fuel as those terms are known in the art. Supercriticality is defined as the point at which the heat of vaporization becomes zero. Supercritical conditions exist when a substance is subjected to temperature and pressure exceeding the thermodynamic critical point of the substance. With respect to the diesel fuel composition embodiment described herein, the supercritical state or liquid near supercritical state of the composition provides optimum properties for combustion.

An aspect of the embodiment is directed to a composition of matter in the form of a mixture of diesel fuel and exhaust gas. The mole fraction, $X_{EG}$, of the exhaust gas in the composition is in the range of 0.0-0.9 for diesel engine applications. The composition can be a liquid near the supercritical phase, or a supercritical fluid, prior to injection into a combustion chamber. Upon injection and mixing with the compressed air in the combustion chamber, the composition becomes a homogeneous single phase in the supercritical region. In order for the liquid diesel fuel-exhaust gas mixture to be near its supercritical phase before the injection of the mixture into the combustion chamber, the temperature of the mixture is brought above 300° C. but below the critical temperature of the composition at a pressure greater than 100 bar. In an aspect, the temperature of the mixture is at about 450° C. When the mixture is a supercritical fluid prior to injection into a combustion chamber, the mixture is at a temperature greater than a critical temperature of the composition and the pressure is greater than 100 bar. According to an aspect, the greater than 100 bar pressure is provided by an injection pump. An associated injector can be maintained at the desired temperature utilizing a heat pipe to transfer heat thereto from an exhaust manifold of the diesel engine.

According to an alternative aspect of the composition embodiment, the diesel fuel is mixed with liquid $CO_2$ and exists as a liquid homogeneous mixture near the supercritical phase before being injected into the combustion chamber. The mixture is maintained at a temperature greater than 300° C. but below the critical temperature of the mixture at a pressure higher than 100 bar. The optimum temperature and pressure values will depend upon the given diesel fuel-$CO_2$ composition. Alternatively, the diesel fuel-$CO_2$ mixture exists as a supercritical fluid prior to being injected into the combustion chamber. In this state, the fuel-$CO_2$ mixture is at a temperature greater than the critical temperature of the composition and the pressure is greater than 100 bar. In all cases, the mixture is a homogeneous supercritical fluid upon injection into the combustion chamber and mixing with the compressed air therein. In an aspect, separate delivery of the diesel fuel and the liquid $CO_2$ is provided prior to injection into the combustion chamber.

The diesel fuel-exhaust gas and the diesel fuel-$CO_2$ compositions of the invention can be used in a variety of diesel engine combustion applications including, for example, marine, automotive or stationary power.

Another embodiment of the invention is directed to a process for combusting a diesel fuel-diluent composition wherein the diluent is either hot exhaust gas or liquid $CO_2$, according to the composition embodiments outlined above. According to one aspect, a process for combusting a diesel fuel and exhaust gas composition includes mixing the diesel fuel and the exhaust gas under conditions such that the composition is a liquid near the supercritical phase of the mixture or the composition is a supercritical fluid, prior to injecting the composition into a combustion chamber, and injecting the composition into the combustion chamber as a homogeneous single phase composition. In another aspect, a process for combusting a composition of diesel fuel and liquid $CO_2$ involves mixing the diesel fuel and the liquid $CO_2$ under conditions such that the composition is a liquid near the supercritical phase of the mixture or the composition is a supercritical fluid prior to injecting the composition into a combustion chamber, and injecting the composition into the combustion chamber as a homogeneous single phase upon injection. Since the diesel fuel-exhaust gas mixture or the diesel fuel-$CO_2$ mixture is delivered as a homogeneous isotropic single-phase, it will combust more completely because liquid droplets are eliminated.

In an aspect of the combustion process embodiment, the mixing of diesel fuel and exhaust gas or diesel fuel and $CO_2$ is accomplished at pressures and temperatures near or above the critical values of these mixtures. In an aspect of the diesel fuel-$CO_2$ mixture, both components are supplied as liquids. At high enough pressures and temperatures, supercritical conditions promote solvation while at the same time prohibit tar formation. These near supercritical, or supercritical, mixtures have optimum properties for combustion.

Another embodiment of the invention is directed to a fuel system for a diesel engine. The fuel system includes a structure containing a mixture of a diesel fuel and either an exhaust gas or liquid $CO_2$, according to the composition embodiments outlined above. The mixture is a liquid near the supercritical region or a supercritical fluid prior to injection into a combustion chamber. The fuel system also includes appropriate injection hardware and control systems as known in the art for delivering the mixture into a combustion chamber of a diesel engine. In various aspects, the fuel system includes a common rail injection system or a common rail system and an injector. According to an aspect, the fuel system further includes a fuel tank containing a supply of the diesel fuel, a combustion chamber, a containment area for mixing the diesel fuel and the exhaust gas or the liquid $CO_2$, various transport conduits, pumps, regulators and the like, an injection pump, and one or more sources of heat for heating the mixture and the injector. In an aspect, a temperature controller will maintain the appropriate temperature of the injector so that the diesel fuel-exhaust gas mixture or the diesel fuel-$CO_2$ mixture is maintained at near supercritical conditions. In another aspect, heat from the exhaust system is used to provide heat for the diesel fuel-exhaust mixture. In this aspect, the heat regeneration cycle extracts useful energy from the exhaust system, which adds additional enthalpy to the combustion cycle near the peak of the compression cycle.

Fuel injection systems in high-speed internal combustion engines inject the fuels at high pressure in rapid pulses of the order of milliseconds. In virtually all of these systems the pressure pulse relies on the incompressibility of the liquid phase with tight tolerances in sealing components that prevent significant fluid leakage by the sliding fit. The sealing components in virtually all injection systems are made from carbonaceous materials such as viton, buna N, Teflon®, plastic and other materials. These materials typically are not suited to withstand the temperatures associated with near-critical or supercritical fluid injection. Therefore sealing materials used for high temperatures are required. In the foregoing embodiments that use liquids near the supercritical region or supercritical fluids, appropriate pumps and seals must be employed which provide accurate metering with acceptable leakage.

The content of EG or $CO_2$ in DF can be controlled as a function of engine operating parameters such as rpm and load. The thermodynamic and transport properties of supercritical DF-EG or DF-$CO_2$ compositions can be more easily tuned and controlled than subcritical two-phase compositions. Delivery of the DF-EG or DF-$CO_2$ composition into the combustion chamber as a homogeneous isotropic single-phase composition provides a significant increase in engine efficiency. Combustion process and fuel system embodiments of the invention provide an improved composition process with reduced formation of particulate matter (PM), aldehydes, polyaromatic hydrocarbons (PAHs), CO, $NO_x$, and $SO_x$.

The foregoing and other objects, features, and advantages of embodiments of the present invention will be apparent from the following detailed description of the preferred embodiments, which makes reference to several drawing figures.

DETAILED DESCRIPTION OF A PREFERRED EMBODIMENT OF THE INVENTION

Figure 1:
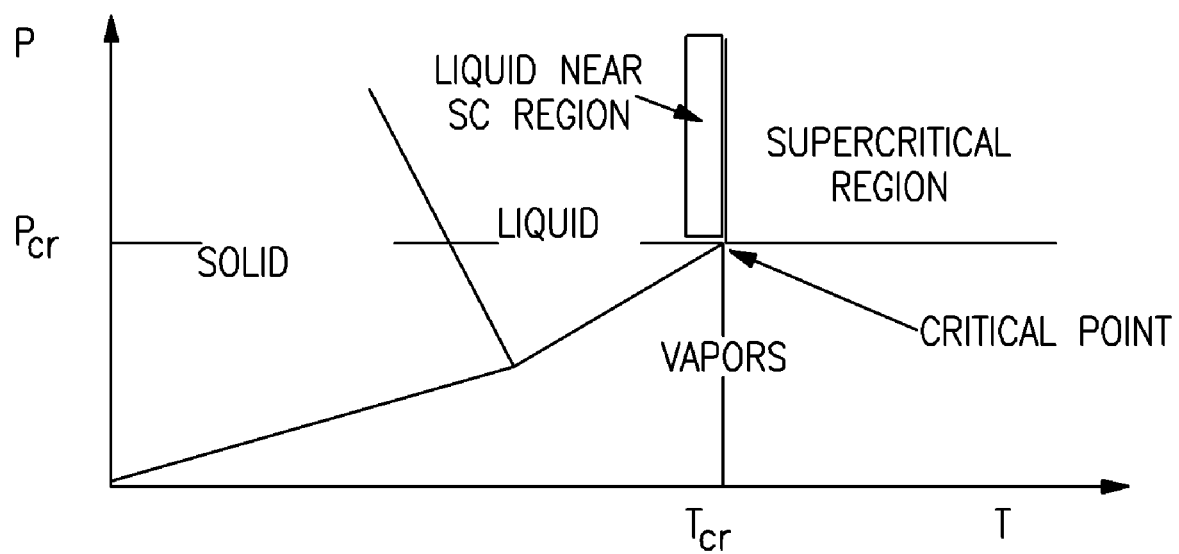
FIG. 1 is a phase diagram used to illustrate the meaning of "liquid near supercritical" and "supercritical" terminology as used herein.

The embodiments of the invention will now be described in detail with reference to the accompanying figures wherein like reference numerals refer to similar references throughout.

Composition embodiments of the invention are based on the expectation that a more complete oxidation of diesel fuel should occur in a homogeneous single-phase mixture of diesel fuel and oxidant at the molecular level, similar to natural gas combustion. This situation can more likely be realized when diesel fuel is injected into a combustor as a supercritical fluid, or it becomes a supercritical fluid during injection. Under these conditions, the density of the composition in the supercritical phase is higher than that of subcritical vapors and the reactivity of diesel fuel components is greatly increased. A reaction moderator/diluent such as $CO_2$ or exhaust gas can be used under these conditions to attenuate the risk of coking and uncontrolled reactions, as these moderators prevent diesel fuel heavy components from coking in the process of bringing the fuel to the supercritical state. The mixing of supercritical fuel-diluent with supercritical air in a combustion chamber occurs near instantaneously due to very high molecular diffusion of the supercritical fuel-diluent (several orders of magnitude higher than that in droplets) and the oxidation is more homogeneous and nearly complete within the reaction space.

An embodiment of the invention is directed to a composition of matter comprising, in one aspect, a mixture of a diesel fuel and an exhaust gas. The mole fraction, $X_{EG}$, of the exhaust gas in the composition is in a range between 0.0-0.9. A molar concentration of exhaust gas equal to zero ($X_{EG}$=0.0) in the diesel fuel mixture relates to engine starting conditions; e.g., starting the engine with no exhaust gas recycling. According to aspects of the embodiment, the fuel-exhaust gas mixture exists as a liquid near the supercritical region, or as a supercritical fluid, prior to injecting the composition into the combustion chamber of a diesel engine. As used herein, the term "liquid near the supercritical region" carries the understanding that pressure values may be at the critical point, nearly above the critical point or well above the critical point as illustrated in FIG. 1. Use of the phrase is not intended to mean or imply that the liquid near the supercritical region is the liquid region near the critical pressure value. The mixture is a homogeneous supercritical fluid upon injection into the combustion chamber and mixing with the compressed air therein. As also illustrated in FIG. 1, the term "supercritical fluid" as used herein, and as a composition delivered into a combustion chamber, does not mean nor imply the delivery of a vaporous fuel mixture near the critical point. As a liquid near the supercritical region prior to injection, the mixture is at a temperature greater than about 300° C. but lower than the critical temperature of the composition. The pressure is above 100 bar prior to injection into the combustion chamber. In an aspect the mixture is at a temperature of about 450° C. prior to injection. Alternatively, as a supercritical fluid prior to injection, the mixture is at a temperature greater than a critical temperature of the composition and the pressure is greater than 100 bar.

In another aspect of the embodiment, a composition of matter comprises a mixture of a diesel fuel and liquid $CO_2$, wherein a mole fraction, $X_{CO2}$, of the liquid $CO_2$ in the composition is in the range between 0.0-0.9. In an aspect, the fuel-$CO_2$ mixture exists as a liquid near the supercritical region prior to injection. In this state, the temperature of the mixture is greater than about 300° C. but lower than the critical temperature of the composition and the pressure is above 100 bar. Alternatively, the mixture is a supercritical fluid prior to injection into the combustion chamber of a diesel engine. In this state, the fuel-$CO_2$ mixture is at a temperature greater than the critical temperature of the composition and the pressure is greater than 100 bar. The mixture is a homogeneous supercritical fluid upon injection into the combustion chamber and mixing with the compressed air therein. In both aspects, an exemplary combustion chamber is a cylinder of a diesel engine.

The high concentration of individual molecules in a supercritical fluid offers desirable reaction enhancing properties. These properties are directly related to the improved transport of reactants, as the diffusivity of molecules in a supercritical fluid is orders of magnitude greater than that of molecules in a liquid state. The changes in reaction rates and reaction by-product yield near the critical point of the diesel fuel-exhaust gas mixture, for example, can therefore be accomplished more rapidly. Transport properties of a fluid vary by three to four orders of magnitude near the fluid critical point. Diesel fuels have a wide range of molecular weight compounds that coke if heated above approximately 200° C. As such, they do not have well defined critical temperatures. However, because mixtures of diesel fuel-exhaust gas or diesel fuel-$CO_2$ can be heated without cooking, these mixtures can be brought to supercritical states.

Although exhaust gas and $CO_2$ mix relatively easily with diesel fuel, they are most advantageously mixed under conditions of temperature and pressure near or above the critical values of the mixtures. Further, advantageous mixing of diesel fuel and $CO_2$ occurs when both components are in a liquid state. At high enough pressures and temperatures, supercritical conditions promote solvation and prohibit tar formation. These liquids near-supercritical or supercritical mixtures have optimum properties for combustion. When the diesel fuel-exhaust gas or diesel fuel-$CO_2$ mixture is a homogeneous isotropic single-phase it will combust more completely upon injection into a combustor because liquid droplets are eliminated. The improved burning reduces particulate matter formation. The more homogeneous dispersion of fuel molecules in air and lower combustion temperatures results in lower nitrous and sulfur oxide emissions. The resulting faster, more complete combustion cycle also lowers emissions of carbon monoxide, unburned hydrocarbons, volatile organics, and PAHs.

Exemplary embodiments of fuel systems 100 and combustion processes will now be described with reference to FIGS.

Figure 2A:
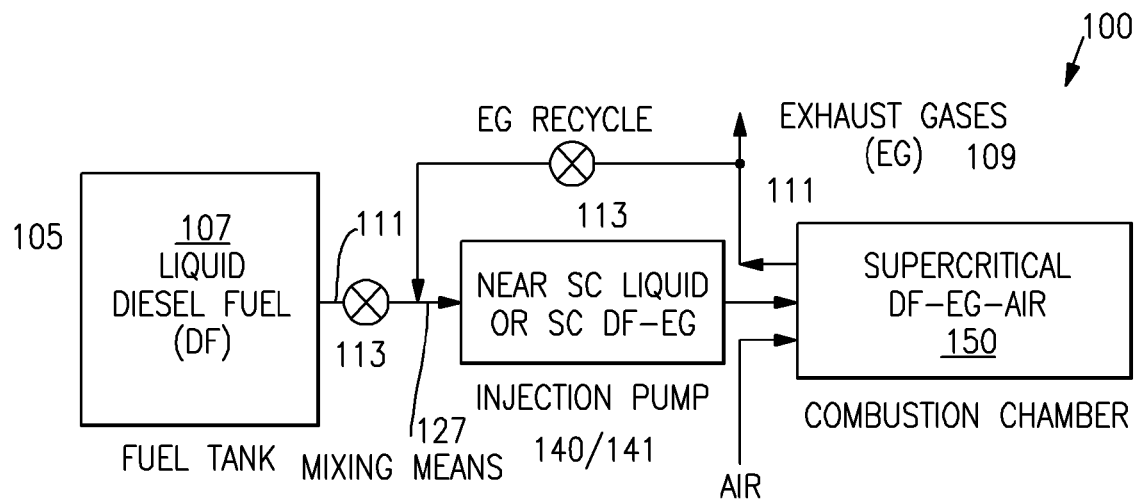
FIG. 2A is a schematic illustration of a supercritical diesel fuel-exhaust gas mixture combustion system according to an embodiment of the invention.

2A, 2B and 2C. As schematically illustrated in FIG. 2A, a fuel system 100 includes a fuel tank 105 containing a supply of liquid diesel fuel 107. A combustion chamber 150 provides a supply of heated exhaust gas 109. Various supply pipes 111 illustrated by arrows, as well as pumping components 113, are shown. The supply of recycled hot exhaust gas 109 from the combustion chamber 150 and the supply of diesel fuel 107 are connected (at 127) upstream of an injection pump/injector assembly 140/141 where they are mixed. The mixture is input to the injector assembly 141 as a liquid near the supercritical region or as a supercritical fluid. The pressure of the mixture can be increased via the injection pump 140 to introduce the mixture into the injection assembly 141 in the subcritical or critical phase. Thus the diesel fuel-exhaust gas mixture exists as a near supercritical liquid or supercritical fluid prior to injection into the combustion chamber 150. In order for the liquid diesel fuel-exhaust gas mixture to be near its supercritical phase, or a supercritical fluid, before injection into the combustion chamber, the mixture is brought above 300° C. at a pressure greater than 100 bar. In an illustrative aspect, the mixture is brought to a temperature of about 450° C. prior to injection. The injector 141 can be maintained at the desired temperature utilizing a heat pipe (not shown) to transfer heat from the exhaust manifold (not shown) of the engine. Upon delivery by injection into the combustion chamber, the diesel fuel-exhaust gas mixture is a homogeneous supercritical fluid. The mixing of the supercritical diesel fuel-exhaust gas mixture with supercritical air in the combustion chamber occurs substantially instantaneously due to very high molecular diffusion. The oxidation is more homogeneous and nearly complete within the reaction space of the combustion chamber.

Figure 2B:
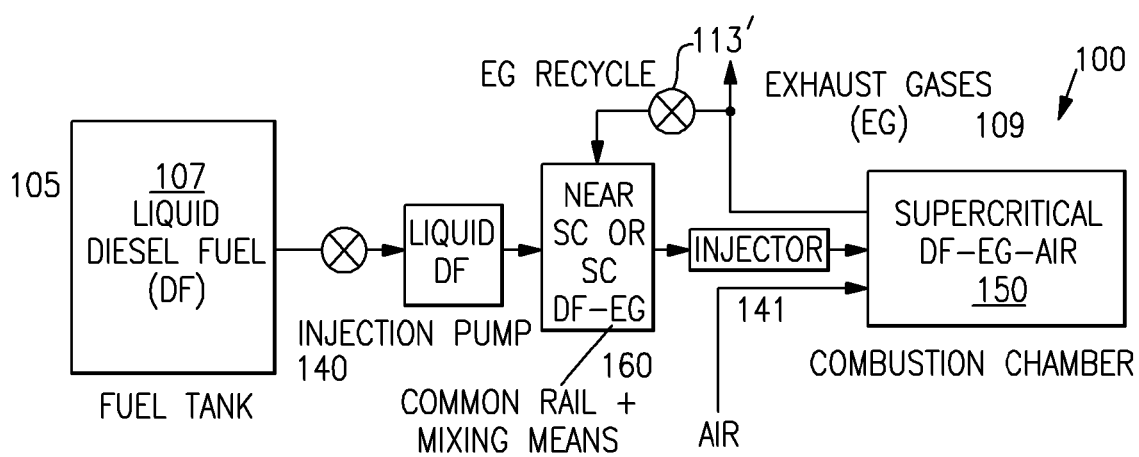
FIG. 2B is a schematic illustration of a supercritical diesel fuel-exhaust gas mixture combustion system according to another aspect of the invention.

FIG. 2B schematically illustrates another exemplary aspect of a fuel system 100 and combustion process. A supply of liquid diesel fuel 107 is provided from fuel tank 105 by an injection pump 140. A supply of exhaust gas 109 is separately provided from the combustion chamber 150 by a compressive pumping component 113'. The constituents 107, 109 are introduced into a manifold of a common rail injection system 160. Here these components mix under near supercritical or supercritical conditions prior to injecting the mixture into the combustion chamber 150 under supercritical conditions. The injector 141 and common rail 160 are heated to approximately 400° C. by the hot exhaust gas from combustion chamber and/or by contact with a heated exhaust manifold of the engine (not shown). The pressure of the mixture is greater than 100 bar. Substantially higher pressure values may be desirable. The injector 141 has a tip (not shown) that is disposed to inject the homogeneous supercritical diesel fuel-exhaust gas mixture into the combustion chamber of the diesel engine.

Figure 2C:
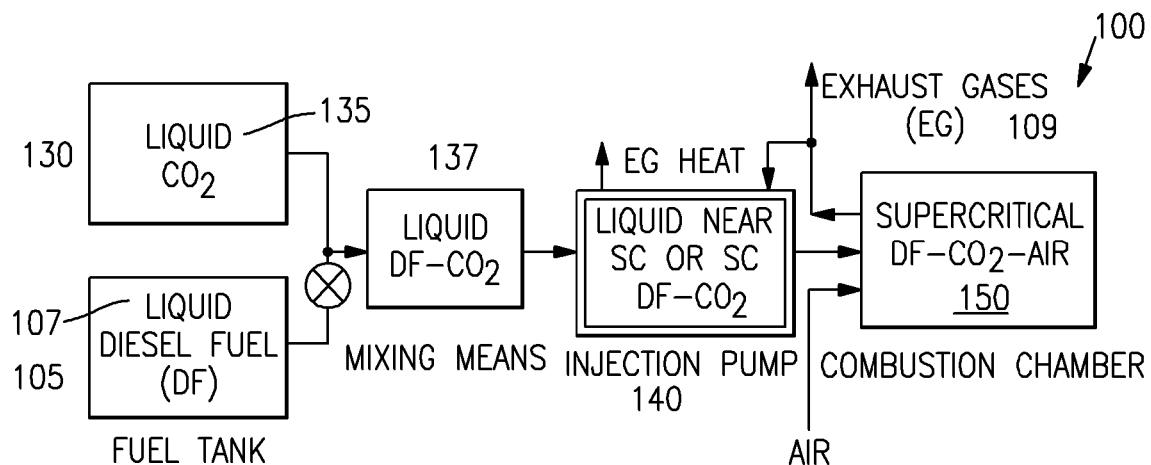
FIG. 2C is a schematic illustration of a supercritical diesel fuel-liquid $CO_2$ mixture combustion system according to another aspect of the invention.

FIG. 2C schematically illustrates an aspect of a fuel system 100 and a combustion process for a diesel fuel-liquid $CO_2$ composition according to an embodiment of the invention. A supply of liquid diesel fuel 107 is provided in fuel tank 105. A supply of liquid $CO_2$ 135 is provided in reservoir 130. The liquid $CO_2$ and the liquid diesel fuel are separately introduced into a mixing device 137 by known means. The mixture is brought to near supercritical or supercritical conditions by increasing pressure and is introduced into the injection pump 140. The mixture in the injection pump is maintained at a temperature greater than 300° C. at a pressure greater than 100 bar using energy of the exhaust gas 109. The optimum temperature and pressure values will depend on the given diesel fuel-$CO_2$ composition as understood by one skilled in the art. Upon injection into the combustion chamber 150, the mixture becomes or remains a supercritical fluid that mixes rapidly with the supercritical air present.

In each of the aspects described above in relation to FIGS. 2A-2C, the content of exhaust gas or $CO_2$ in the diesel fuel can be controlled as a function of the engine operating parameters such as rpm and load. Accordingly, diesel fuel and exhaust gas or $CO_2$ sensors could be timed with respect to the crankshaft of the engine to control the specific compositions. A temperature controller can be used to maintain the appropriate temperature of the injector so that the mixtures contained therein are maintained at near supercritical or supercritical conditions. When heat from the exhaust system is used to provide heat for the mixtures, this heat regeneration cycle extracts useful energy from the exhaust system, which adds additional enthalpy to the combustion cycle near the peak of the compression cycle.

The present technology is suited to both mobile and fixed applications. For example, the diesel fuel-exhaust gas and diesel fuel-$CO_2$ compositions of embodiments of the invention could be used in the combustors of marine, automotive or stationary power applications.

EXPERIMENTS

Figure 3:
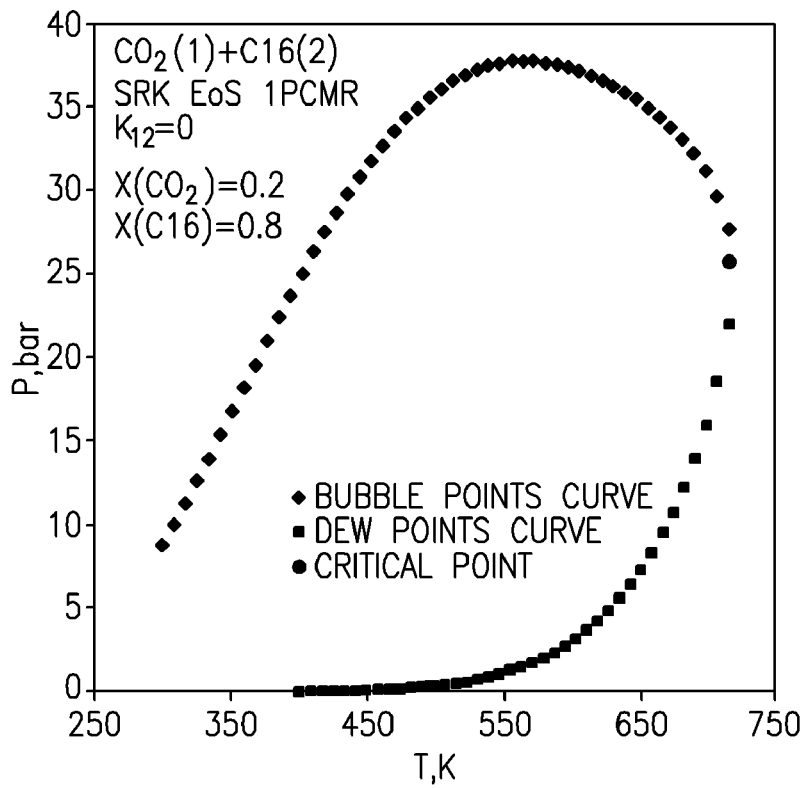
FIG. 3 is a phase diagram for a cetane-$CO_2$ mixture having a mole fraction of $CO_2$ equal to 0.2.
Figure 4:
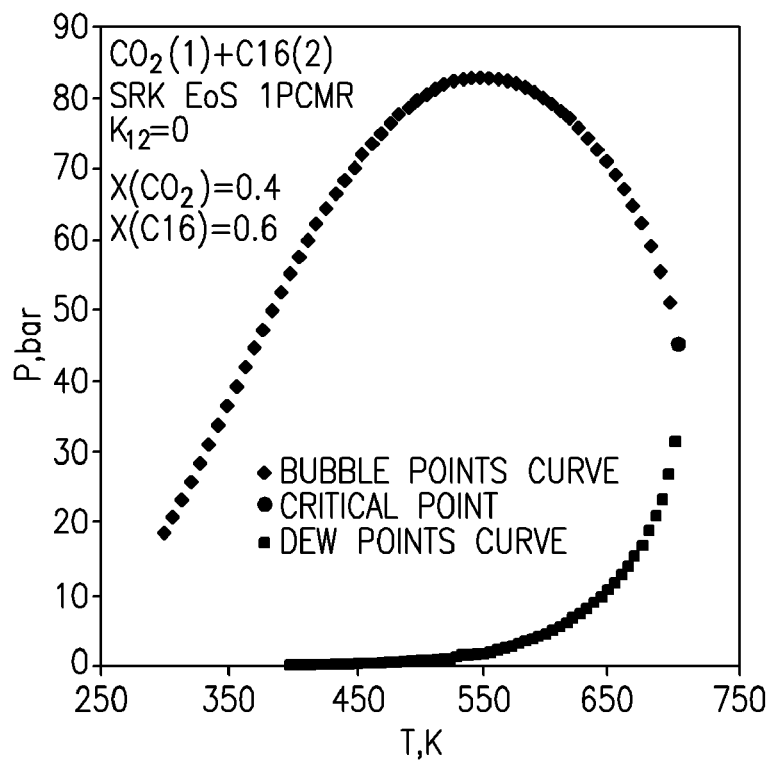
FIG. 4 is a phase diagram for a cetane-$CO_2$ mixture having a mole fraction of $CO_2$ equal to 0.4.
Figure 5:
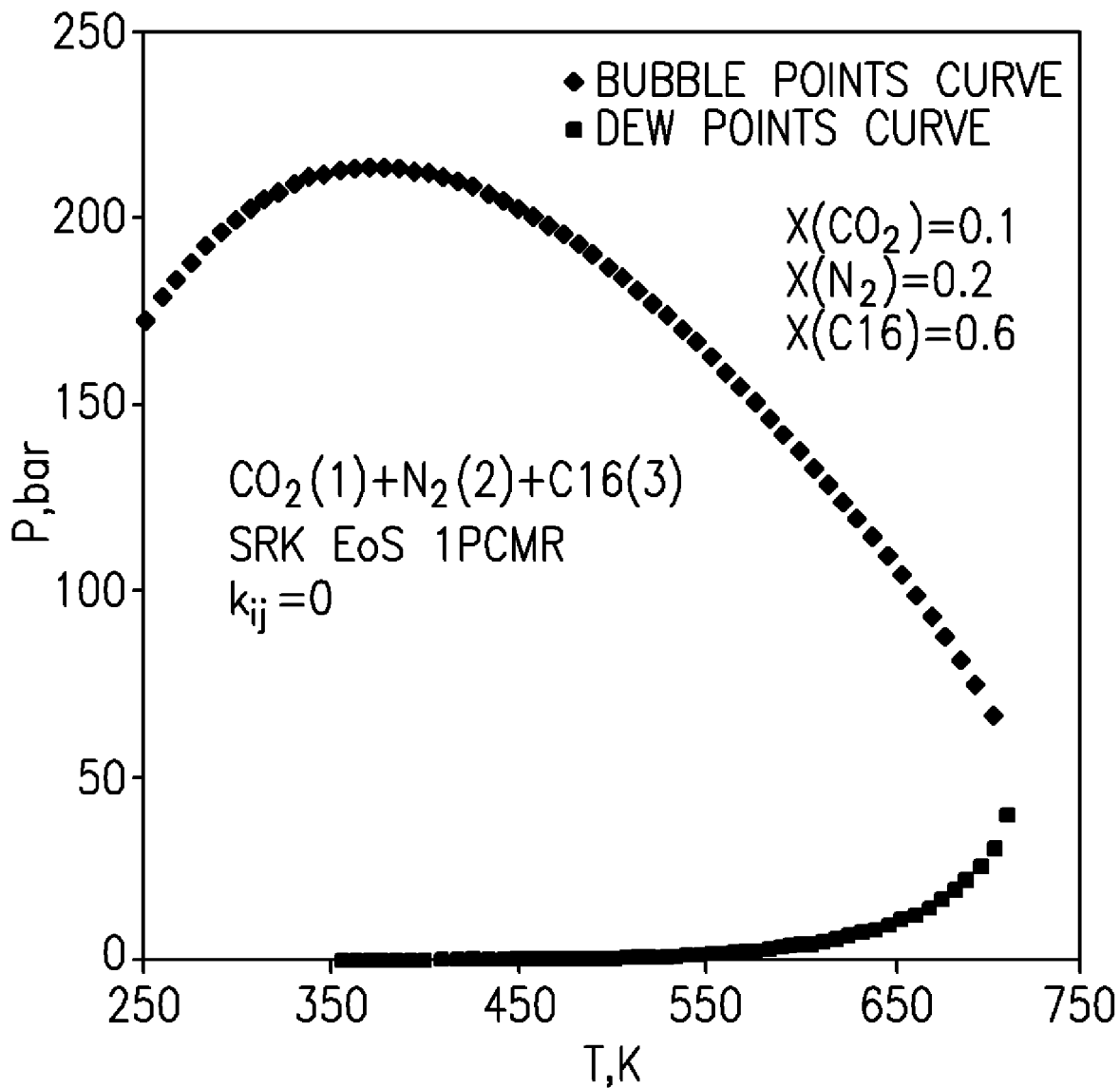
FIG. 5 is a phase diagram for a cetane-$CO_2$—$N_2$ mixture having a mole fraction of $CO_2$ equal to 0.1 and a mole fraction of $N_2$ equal to 0.2.

Based on the assumption that diesel fuel physical properties can be approximated by n-hexadecane (cetane), a pressure-temperature phase diagram of the cetane-$CO_2$ mixture of constant composition can be used to determine the subcritical and supercritical phases of diesel fuel-$CO_2$ mixtures, as shown in FIGS. 3 and 4. FIG. 3 is a pressure-temperature phase diagram for a cetane-$CO_2$ mixture in which the mole fraction of $CO_2$ ($X_{CO2}$) is 0.2. For this case, the critical point temperature is 442° K. and pressure is 26 bar. FIG. 4 is a pressure-temperature phase diagram similar to FIG. 2, with the mole fraction of $CO_2$ equal to 0.4. The critical point temperature is 430° K. and the pressure is 42 bar. FIG. 5 similarly illustrates the case of cetane-$CO_2$—$N_2$ ternary mixtures with $X_{CO2}$=0.1 and $X_{N2}$=0.2. The critical point is located at 440° K. and 50 bar.

A first set of experiments was performed to assess the behavior of diesel fuel #2-$CO_2$ mixtures in the preheating pipes of a continuous flow tubular reactor. Liquid diesel fuel #2 and $CO_2$ were pumped separately at 100 bar by two syringe pumps (ISCO 100D) and mixed in a common heated pipe (50 cm×1 mm ID) at different temperatures in the range 400-500° C. When only DF was pumped, it coked at 400° C. and the heated pipe plugged. However, in the presence of $CO_2$ (diesel fuel: $CO_2$ of 10:1 volumetric flow rates), the coking phenomenon was avoided. Thermolysis reactions are negligible below 475° C. but the thermal decomposition of some fuel components became significant at 500° C.

Figure 6A:
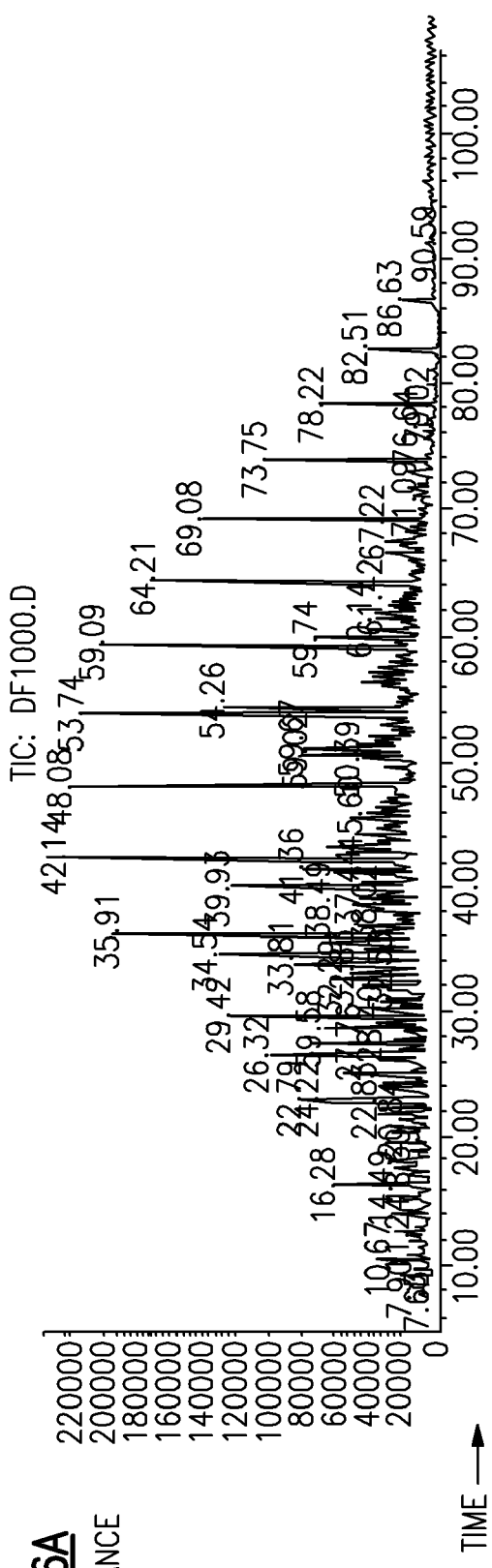
FIG. 6 is a GC-MSD comparison between an initial diesel fuel #2 composition and the combustion products of this mixture.
Figure 6B:
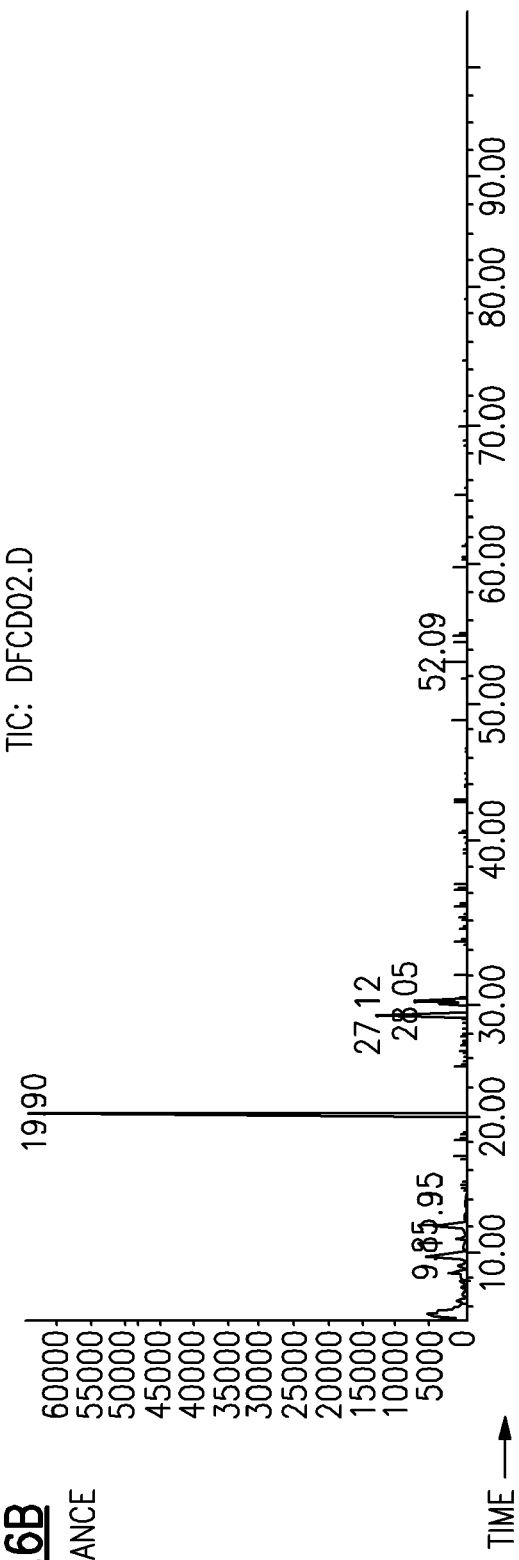

In a second sets of experiments, mixtures of diesel fuel #2 and $CO_2$ under the above conditions were pumped and mixed with preheated and compressed air into a tubular, high-pressure reactor, which was kept at desired temperature values in a fluidized sand bath (Techne SBL-2). The reaction products at about 2 s contact time were separated as liquid and gas phases and analyzed by GC-MSD and GC-TCD methods, respectively. The overall conversion of diesel fuel was found to strongly depend on temperature such that at 550° C. essentially all the fuel was combusted to $CO_2$ and $H_2O$. At temperatures lower than 550° C. small amounts/traces of CO were produced, however, at 550° C. neither CO nor nitrogen oxides were detected. Chromatograms of the initial diesel fuel #2 composition and of the condensed vapor products are shown in FIG. 6 for a critical point of 550° C. and 100 bar, with $X_{CO2}$=0.347. FIGS. 6A and 6B show GC-MSD comparisons between initial diesel fuel composition and combustion products of DF-$CO_2$. The peaks at 19.94 min in FIG. 6A and at 19.90 min in FIG. 6B represent naphthalene.

These experiments suggest that a fuel injector system for a diesel engine operating in the range of 400-500° C. and greater than about 100 bar will provide significant advantages over current technology. In order to maintain the lubrication properties of the liquid diesel fuel, liquid subcritical but near supercritical, or supercritical, conditions are advantageous. One advantage is that these higher temperatures will provide less ignition delay and will add enthalpy to the combustion process. Expanding the supercritical fuel mixture like a gas into the heated air in the cylinder provides better mixing and combustion at a molecular level and eliminates droplet formation. Use of exhaust heat to provide the required temperatures is also beneficial for the engine cycle efficiency in addition to the accompanying improvements in emissions as a result of faster, more complete combustion.

The foregoing description of the preferred embodiments of the invention has been presented for the purposes of illustration and description. It is not intended to be exhaustive or to limit the invention to the precise form(s) disclosed. Many modifications and variations are possible in light of the above teaching. It is intended that the scope of the invention be limited not by this detailed description, but rather by the claims appended hereto.

We claim:

1. Composition of matter comprising a mixture of a diesel fuel and an exhaust gas, wherein the fuel-exhaust gas mixture is one of a liquid near a supercritical region and a supercritical fluid prior to injection into a combustion chamber of a diesel engine, and the mixture is a homogeneous supercritical fluid upon injection into the combustion chamber.

2. The composition of claim 1, wherein the mixture is at a temperature greater than about 300° C. but lower than a critical temperature of the composition and the pressure is above 100 bar prior to injection into the combustion chamber.

3. The composition of claim 2, wherein the mixture is at a temperature of about 450° C.

4. The composition of claim 1 wherein the mixture is at a temperature greater than a critical temperature of the composition and the pressure is greater than 100 bar, wherein the fuel-exhaust gas mixture is a supercritical fluid and remains a homogeneous supercritical fluid upon injection into the combustion chamber.

5. The composition of claim 1 wherein the combustion chamber is a cylinder of a diesel engine.

6. Composition of matter comprising a mixture of a diesel fuel and liquid CO2, wherein a mole fraction, $X_{CO2}$, of the liquid $CO_2$ in the composition is in the range between 0.0-0.9, wherein the fuel-$CO_2$ mixture is one of a liquid near a supercritical region and a supercritical fluid prior to injection into a combustion chamber of a diesel engine, and the mixture is a homogeneous single-phase fluid upon injection into the combustion chamber.

7. The composition of claim 6, wherein the fuel-$CO_2$ mixture is at a temperature greater than about 300° C. but lower than a critical temperature of the composition and the pressure is above 100 bar.

8. The composition of claim 6 wherein the fuel-$CO_2$ mixture is at a temperature greater than the critical temperature of the composition and the pressure is greater than 100 bar, wherein the fuel-$CO_2$ mixture is a supercritical fluid and remains a homogeneous supercritical fluid upon injection into the combustion chamber.

9. The composition of claim 6 wherein the combustion chamber is a cylinder of a diesel engine.

* * * * *